G. C. SNYDER.
APPARATUS FOR MANUFACTURING HOLLOW WARE.
APPLICATION FILED JULY 23, 1917.
1,270,889.
Patented July 2, 1918.
4 SHEETS—SHEET 1.
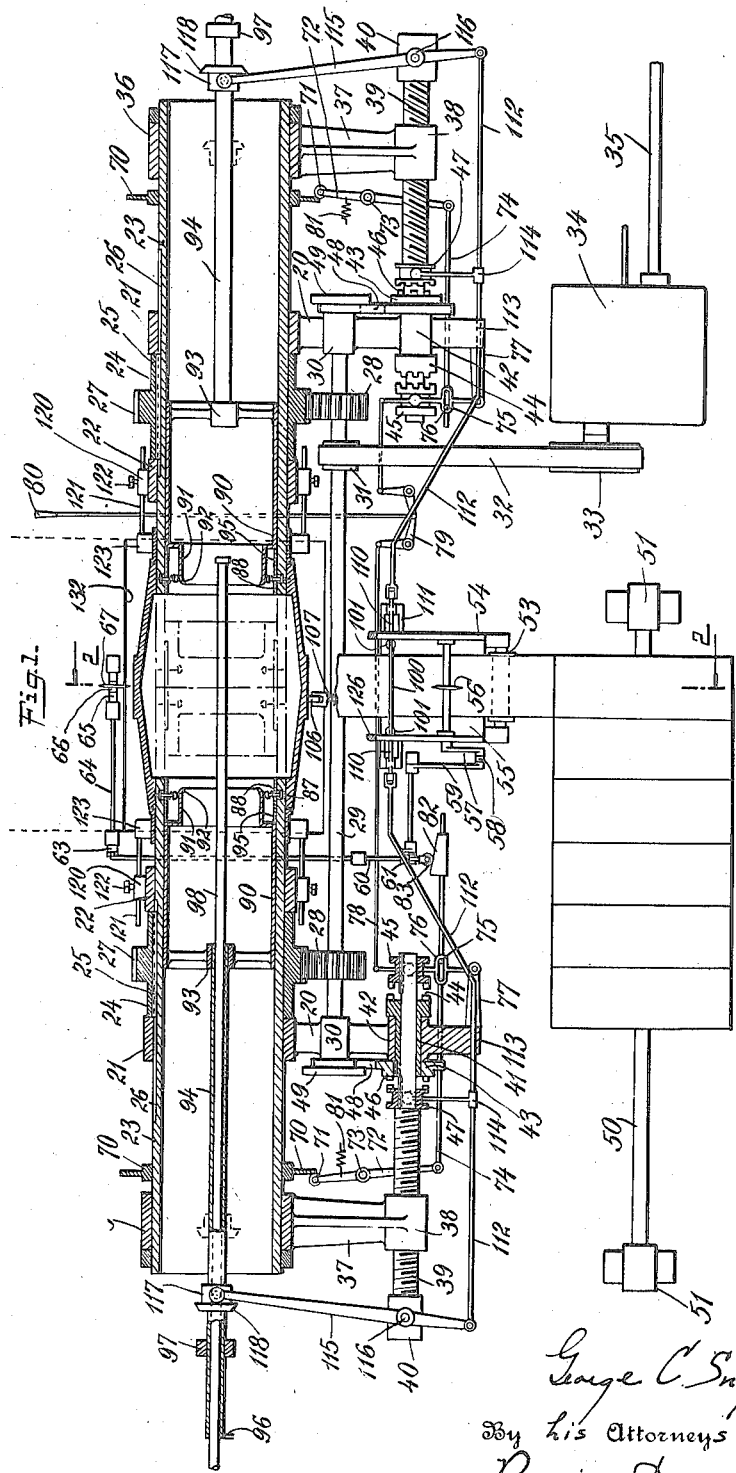
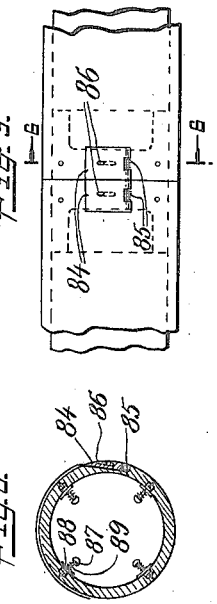
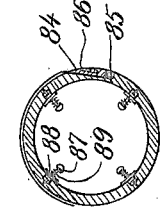
George C. Snyder, Inventor
By his Attorneys
Pennie, Davis, Marvin & Edmonds

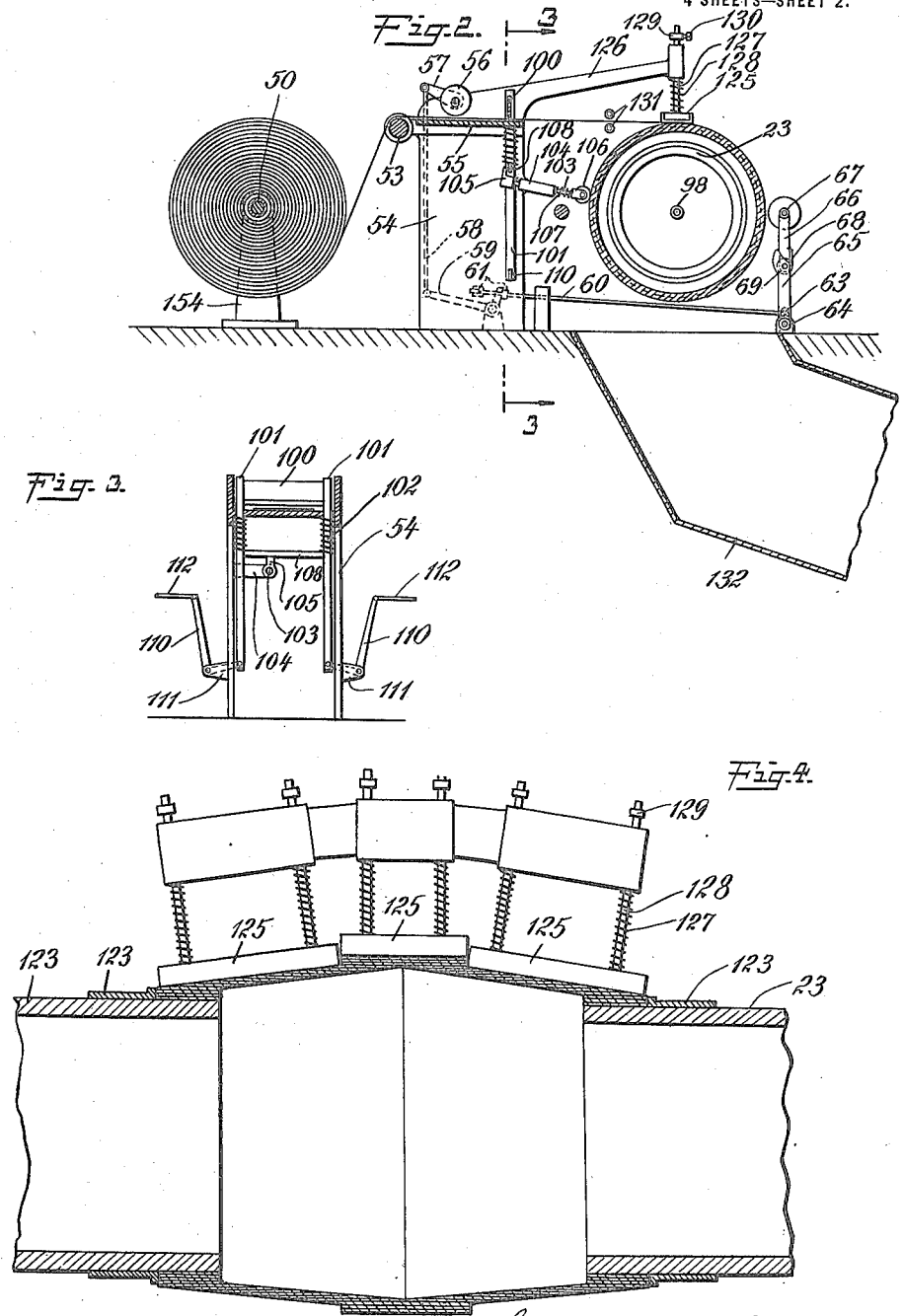

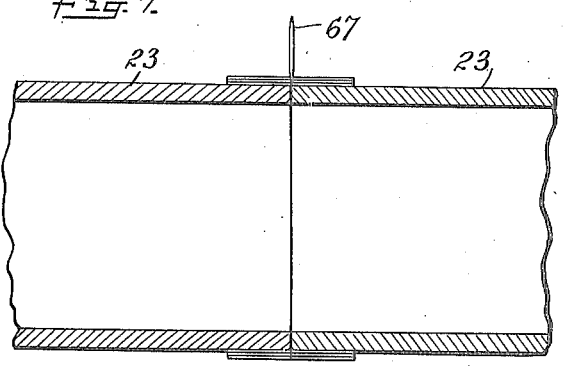
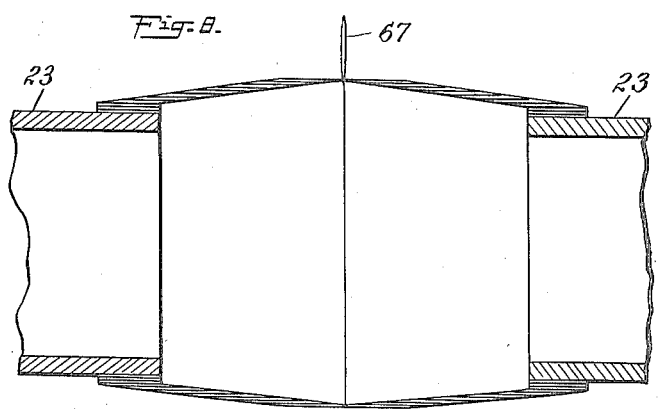
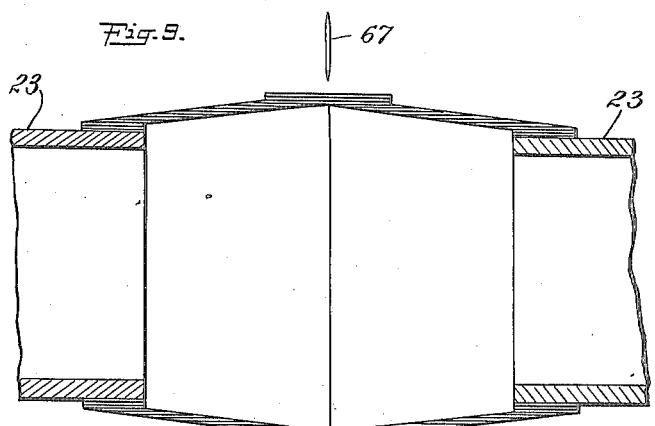

G. C. SNYDER.
APPARATUS FOR MANUFACTURING HOLLOW WARE.
APPLICATION FILED JULY 23, 1917.

1,270,889.

Patented July 2, 1918.
4 SHEETS—SHEET 4.

Inventor
George C. Snyder,
By his Attorneys
Pennie, Davis, Marvin & Edmonds

UNITED STATES PATENT OFFICE.

GEORGE C. SNYDER, OF NEW YORK, N. Y., ASSIGNOR TO WILLIAM H. DAVIS, TRUSTEE, OF NEW YORK, N. Y.

APPARATUS FOR MANUFACTURING HOLLOW WARE.

1,270,889.   Specification of Letters Patent.   Patented July 2, 1918.

Application filed July 23, 1917. Serial No. 182,166.

*To all whom it may concern:*

Be it known that I, GEORGE C. SNYDER, a citizen of the United States, residing at New York, in the county of New York, State of New York, have invented certain new and useful Improvements in Apparatus for Manufacturing Hollow Ware; and I do hereby declare the following to be a full, clear, and exact description of the invention, such as will enable others skilled in the art to which it appertains to make and use the same.

The present invention relates to an apparatus for use in the manufacture of hollow articles such as barrels, kegs, cartons, pails, tubs and the like. While the invention may find its widest field of usefulness in the manufacture of containers and receptacles for all purposes, it is not limited to such classes of articles but may be used for the production of tubular structures adapted for a wide variety of uses, especially in the manufacture of furniture and similar articles.

It is an object of the invention to produce an apparatus by means of which articles of the above character may be produced quickly and cheaply by a comparatively simple operation of winding a strip or strips of suitable material in a series of overlapping convolutions which are united to each other to form in effect an integral structure. The articles thus produced may be treated either during the process of formation or afterward with any suitable substance to render them impervious to the action of any liquids or other materials which it is intended they shall contain.

The apparatus for forming the articles possesses capabilities of adjustment which permit the articles to be given a wide variety of shapes to best adapt them for their intended uses. At the same time the apparatus is of simple construction, has few moving parts, and may be operated by a minimum expenditure of power.

Heretofore containers have been made by winding paper or container board into the shape of drums and sometimes reinforced by hoops. Containers of this general type with slight modifications have gone into extensive use in sizes ranging from small mailing tubes up to receptacles having a capacity of several gallons, but so far as I am aware it has never been possible to give to any of these wound containers the correct shape of a barrel having an arch or bilge midway between the ends. It may be laid down as an essential requirement for barrels designed to carry heavy loads that they be thus formed in order to obtain the strength of the arched or bilged portion as well as to permit of their being easily turned up on end, or conveniently directed in their course when rolled along. It has also heretofore been impossible to make tapered pails, tubs and similar articles out of paper or like materials except by a process of molding pulp when in a softened condition and thereafter allowing it to harden and by treating it with appropriate substances to render the articles water-proof, or by cutting out a paper blank adapted to form a tapered pail shell when the extremities of the blank are brought together and fastened by rivets or in any other manner. The latter method results in a seam parallel to the axis of the pail and this is objectionable as the seam may open when the pail is used. The method of the present invention is more economical and produces stronger and better looking articles than any methods heretofore used of which I am aware.

The present invention avoids difficulties attending the previously described methods of manufacturing hollow articles by providing a novel mode of constructing the articles and a machine by which the articles may be constructed in this novel manner at a minimum of expense. The invention has the further advantage that the articles may be constructed of a wide variety of substances ranging from metallic strips, or mineral fibers such as asbestos, to the commonest forms of vegetable fiber, such as the pulp of straw or wood, the only requirement being that the material must be capable of being formed into ribbons or webs of great length such as the rolls of paper commonly used for newspapers, and preferably the material, if paper should be practically free from sizings, fillers and the finishing substances generally found in commercial papers, and which do not add strength.

The present invention should be distinguished from those processes for producing tubes and cylindrical containers having straight, parallel sides, as well as all the processes now in common use for making waterproof and non-waterproof paper tubes by a winding operation, since these said processes depend on the introduction of the binding and water-proofing elements in a thin liquid state and under conditions which put a limit upon the speed with which the stock may be fed to the apparatus upon which it is wound into shape. Even with the use of any of these common forms of apparatus the result is at best the production of articles having straight, plane parallel sides, no bilge nor flare nor taper being possible.

The present invention makes possible the use of strips of material previously coated with a suitable solidified, or dry adhesive which is moistened just prior to the winding operation. By means of this method the strips may be fed rapidly to the apparatus and the speed of production is thereby increased over those processes to which reference has just been made.

In the case of many containers and particularly barrels, the heads are applied after the body of the barrel has been formed and the present invention meets this manufacturing practice by enabling the articles to be formed with comparatively thick chimes into which the heads may subsequently be driven and retained in place by glue or in any other manner.

The apparatus of the present invention has the further feature of advantage that articles in the form of bilged barrels as well as articles in the form of tapered pails may be made upon the same machine, which may be altered to produce one or the other type of article by simply putting into or taking out of action certain knives or slitters as will appear more clearly from the description of a machine embodying the present invention.

Such a machine is illustrated in the accompanying drawings, in which—

Figure 1 is a plan view partly in section of the entire machine;

Fig. 2 is a view principally in section along the line 2—2 of Fig. 1;

Fig. 3 is a view in section along the line 3—3 of Fig. 2 showing the devices for cutting the strip of paper;

Fig. 4 is an enlarged view showing the devices for pressing out and wiping off the superfluous moisture when the formation of an article has been completed;

Fig. 5 is a detailed view showing the two mandrels of the apparatus in engaging position;

Fig. 6 is a view of the mandrel in section along the line 6—6 of Fig. 5;

Fig. 7 is a view in section of the mandrels of the apparatus in the position which they occupy at the beginning of a winding operation with a number of layers of material wound thereon;

Fig. 8 is a sectional view of the mandrels and the article at a later stage of the operation showing the overlapping convolutions of the strips;

Fig. 9 is a similar view showing the article after the final winding operation has taken place;

Figure 10:
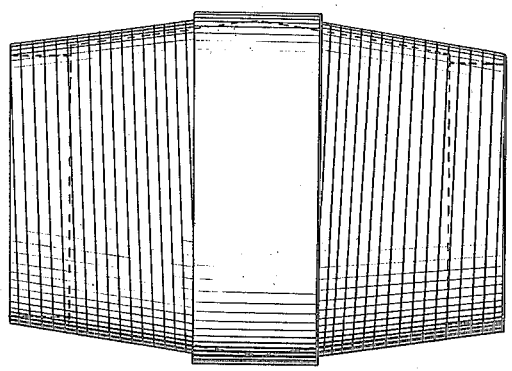
Fig. 10 is a view of a completed article which in the present case is the circumferential shell of a barrel.

Referring to the drawings, in which similar reference characters denote similar parts throughout the several views, 20 indicates a pair of supports which are attached to a suitable base upon which the apparatus is mounted. Each of the supports is provided with a bearing ring 21. A second pair of supports is mounted between the first mentioned supports and each of them is also provided with bearing rings 22 having the same internal diameter as the bearing rings 21. In the two bearing members on each side of the machine is placed a cylindrical mandrel 23 upon which the desired article is wound, as will hereinafter appear. Each section of the mandrel is adapted to be rotated and also moved longitudinally within the bearings 21 and 22. Rotation is effected by means of collars 24 surrounding the mandrels between the bearings 21 and 22 and connected to the mandrels by keys 25 which fit in slots 26 cut lengthwise of the mandrels and of sufficient length to permit the necessary longitudinal movements of the mandrels during all possible operations of the apparatus.

Each of the collars 24 is formed with a gear 27 adapted to mesh with a corresponding gear 28 on a shaft 29 which is supported in bearings 30 formed in the supports 20. Shaft 29 also carries a pulley 31 adapted to be connected by a belt 32 to a pulley 33 of any convenient form of starting and reversing gear 34 which is driven from a power shaft 35.

In order to obtain longitudinal movement of the mandrels each one of them has attached to its outer end a collar 36 having an extended arm 37 provided with a nut 38 through which a screw 39 passes. The screw 39 is supported at its outer end in a bearing 40, while at its inner end it is formed as a shaft passing through a sleeve 41 which is rotatably mounted in a bearing 42 in the support 20. A pulley 43 having two faces of different diameters is mounted upon one end of sleeve 41 and the other end of the sleeve is formed as a clutch member 44. The other member of this clutch is in the form of a collar 45 keyed on the end of the shaft portion of 39 so that it may be moved longitudinally into or out of engagement with clutch member 44. Clutch teeth 46 are also formed on the outer face of pulley 43 and these teeth are adapted to be engaged by a clutch collar 47 keyed on that portion of the screw 39 which constitutes a shaft passing through the sleeve 41. Each pulley 43 is driven by means of a belt 48 passing over a pulley 49 attached to the corresponding end of shaft 29 and having two faces of different diameters. The clutches described above constitute means whereby the shafts 39 may be driven at will to cause longitudinal travel of the mandrels. As will hereinafter appear, these clutches are to be thrown at the proper time in the operation of the apparatus when longitudinal movement of the mandrels should take place.

The strips of material out of which the articles are to be formed are wound in rolls and for convenience and rapidity in the operation of the apparatus a number of rolls of the material may be placed upon a rod 50 mounted in bearings 51 adjacent the apparatus. With this arrangement after one strip of material has been used up a second strip may be brought quickly into place.

During certain periods in the operation of manufacturing some kinds of articles the strips of material should be cut in two prior to the winding operation. For this purpose the material after being unwound from the supply roll, is carried over a roller 53 mounted on the edge of a support 54, comprising two vertical columns connected by a shelf 55 above which is a circular knife 56 mounted eccentrically upon one end of a lever 57 by means of which it may be depressed to cut the paper or lifted up to allow the paper to pass freely over the shelf under the knife. Lever 57 is operated by means of a rod 58 which is connected to one end of a bell crank lever 59 mounted near the base of support 54. The other arm of the bell-crank lever contains a slot through which passes a rod 60 provided with a nut 61 adapted to be engaged by the short arm of the bell-crank lever to actuate the rod 60. The outer end of rod 60 is connected to a crank 63 on the end of a shaft 64 passing along the front of the machine and near the base thereof. Shaft 64 terminates near the center of the machine and at this point is provided with a vertical arm 65 to which is pivoted a second arm 66 carrying at its outer end a second circular knife 67. In order to retain the arms 65 and 66 in line and yet permit a certain amount of movement between them a spring 68 wound around the pivot pin 69 between these two arms and having its free end attached to arm 66 is provided. The second knife 67 is adapted to fit into the cut made by the first knife 56 and is added to insure that the material is properly slit before being wound into the final form.

The knives described above are adapted to be actuated automatically at certain stages in the operation of the apparatus. Each mandrel section is provided with a collar 70 which, when the mandrel reaches the proper point in its longitudinal travel, is adapted to engage a roller 71 on the end of a lever 72 pivoted at 73 and having connected to its other end a rod 74. This rod 74 carries a pin 75 projecting through a slot in a lever 76 pivoted to a bracket 77 which is attached to the support 20. Lever 76 is connected to the movable clutch member 45 and is adapted to be actuated by a rod 78 which passes to a bell crank lever 79 which may be actuated manually by a rod 80 extending to the front of the machine. The inner end of the lever 72 is adapted to be normally drawn toward the center of the apparatus by a spring 81 which may be attached in any convenient manner to the support 20 or other fixed part of the machine. As thus far described the elements just referred to, with the exception of the common handle 80, are similar on the two sides of the apparatus, but on one side thereof the rod 74 is extended and carries a cam 82 having an inclined face against which presses a roller 83 on the end of rod 60. With the above arrangement the rod 60 will be actuated by the inclined face of the cam member to carry knife 67 away from the paper, and also through the bell-crank lever 59 and rod 58 the first knife 56 will also be lifted out of engagement with the paper, and both of these operations will occur when the mandrel has actuated lever 72.

Since the articles are formed by winding strips of material upon the mandrels it is necessary that means be provided for gripping the end of the paper strip while the first few convolutions are being wound upon the mandrel. In this stage of the operation the two parts of the mandrel are in engagement as shown in Fig. 5, and this figure as well as Fig. 6, shows most clearly the means for gripping the end of the strip of material. This gripping means consists in effect of a small door at the inner end of each mandrel and having its outer face curved to conform to the cylindrical contour of the mandrel. The door is indicated by reference character 84 and it is attached to the mandrel by a spring-hinge 85 so that it normally occupies the position indicated in Fig. 6. In order that the grip may be conveniently opened against the effect of its retaining spring a recess 86 is cut in the outer face of the grip and a hook or any other convenient tool may be inserted in this recess.

At a subsequent stage of the operation of forming an article upon the apparatus it becomes necessary to separate the mandrels while retaining the preliminary convolutions in place upon the ends of the mandrel. Although the ends of the strips are retained by the grips described above there will be a tendency for other portions of the strips lying upon the end of the mandrel to be drawn off and to prevent this a number of pins 87 are provided. These pins are slidably mounted in bearings 88 on the inside of the mandrel as shown most clearly in Fig. 6. Each pin is provided with an enlarged inner head between which and the bearing is placed a spring 89 which normally tends to draw the pin inwardly so that its point is beneath the outer surface of the mandrel.

In order to force the points of the pins outwardly to engage the paper wound upon the outside of the mandrel a tubular actuator is placed within each section of the mandrel. Each actuator comprises a cylindrical portion 90 of a size to fit closely within the mandrel and an extension 91 of lesser diameter and having its outer edge curved inwardly as at 92 to act as a cam surface to cause a gradual outward movement of the pins to force their points into the material which has been wound upon the outside of the mandrel. The tubular actuators just described are each provided with a hub 93 to which is connected a rod 94 extending through and out of the end of the mandrel. To limit the inward movement of the actuators the bearing plates 88 may be extended along the inside of the mandrel as shown at 95 in Fig. 1. When the mandrels are in engagement as indicated in dotted lines in Fig. 1 the pins 87 should be withdrawn from beneath the surface of the mandrel. The actuators for the pins should therefore occupy the position indicated in dotted lines in this figure with the edges 92 spaced apart from the heads of the pins. To insure that the actuators cannot be moved beyond this limiting position adjustable stops 96 are attached to the rods 94 and engage the supports 97, through which the rods move, to limit the inward movement of the latter.

In the manufacture of certain articles, especially those that are for the purpose of holding certain liquids, it is necessary to apply a coating of liquid-proof material to the interior of the article. This may be done conveniently during the process of forming the article, and for this purpose a pipe 98 is led through one of the rods 94 which is made tubular for this purpose. This pipe is provided with apertures at its inner end by which the desired liquid may be sprayed onto the interior of the article during the process of formation.

Just prior to the completion of an article upon the apparatus it is necessary that a strip of material be severed and in the present apparatus a knife 100 is provided for this purpose. This knife is mounted between the upper ends of two rods 101, which, as shown most clearly in Fig. 3, extend downwardly through the shelf 55 between the two sides of the support 54. Both of the rods are surrounded for a portion of their length with spiral springs 102 which are arranged to draw the knife downwardly to cause it to cut the strip of material. To retain the knife in its upper position until the article has assumed its desired form a trigger arrangement is provided. This consists of a rod 103 passing through a bracket 104 formed as a part of the support 54 and carrying at its inner end a member 105. At its outer end the rod 103 is provided with a fork between the prongs of which is a roller 106 and this roller is pressed against the outer surface of the article as it is being formed upon the mandrel by means of a coil-spring 107 wound about the rod 103 between the outer end of the bracket and the fork. Until the article reaches the desired size the member 105 is underneath a crossbar 108 extending between rods 101. When, however, the article is built up to the desired diameter the portion 105 is forced from underneath the crossbar 108 and the springs 102 immediately draw the knife into engagement with the strip of material cutting off the latter.

Connected to the lower ends of rods 101 are bell-crank levers 110 mounted upon brackets 111 extending outwardly from the sides of the support 54. Rods 112 are connected to the outer ends of the bell-crank levers and are bent as shown in Fig. 1 and extend through bearings 113 in the outer ends of the supports 20. Clamped on each rod is a fork 114 the prongs of which fit within clutch sleeve 47. Connected to the outer end of each rod 112 is a lever 115 pivoted at 116 on the bearing 40 and extending to a point just above the rod 94 where it is provided with a pin which is normally pressed outward by a small spring. The pin is adapted to engage a collar 117 which is adjustably attached to the rod 94. This collar is provided with an inclined cam-face 118 over which the pin on the end of the lever is adapted to ride, as the rod 94 moves outwardly during the longitudinal travel of the mandrel. After the pin has passed over the cam it drops behind the latter and thus furnishes a connection by means of which the rod 94 and the pin-actuating member 90 attached thereto may be drawn outwardly by movement of the lever 115 caused by the rod 112 being drawn inwardly under the influence of the spring 102 when the mechanism of knife 100 is released.

Each of the supports 22 has extending from its outer surface a number of brackets 120. These brackets have apertures adapted to receive rods 121 which may be clamped in any position of adjustment by nuts 122. Attached to the outer ends of these rods is a collar 123 which closely surrounds the mandrel 23 and which serves as a stop for the outer end of the finished article when the mandrel is withdrawn from the interior of the article to remove the latter from the apparatus.

A number of wipers 125 are mounted upon a bracket 126 extending forwardly from the top of the support 54, as shown most clearly in Fig. 4. These wipers are normally pressed into engagement with the outer surface of the article as it is being formed by means of springs 127 which surround the rods 128 by means of which the wipers are carried. The free ends of these rods are provided with adjustable stops 129 which may be retained in any desired position by nuts 130. The stops 129 should preferably be so set that the wipers 125 will not come into engagement with the outer surface of the article until the formation of the latter has been practically completed, as otherwise they might tend to remove the moisture which should be retained upon the strips of material during the winding operation. For the purpose of wetting the material preparatory to the winding operation the jets 131 above and below the strips of material are provided.

Beneath the central portions of the apparatus and in position to receive the finished articles as they are released from the machine is a trough 132 which may be led to any convenient point to which it is desired to convey the completed articles.

Fig. 1 represents the condition of the apparatus after an article such as a barrel has been formed thereon and just prior to the release of the knife 100 to cut the strip of material. In describing a complete cycle of operations of the apparatus it will be most convenient to consider the latter in its normal condition, that is, with the two sections of the mandrel placed together as indicated in dotted lines in Fig. 1. The end of the strip of material of which the article is to be formed is drawn over roller 53, over plate 55, under the knives 56 and 100, the latter of which should at this time be in its raised position, between the jets 131 and over the surface of the mandrel where it is retained under the grips 84 which for convenience should be brought into position just above the knife 67. The apparatus is then ready to be started into action to perform the winding operation. This act is performed by operating the reversing gear 34 to connect the power shaft 35 to the belt drive to cause the shaft 29 to rotate in the proper direction to cause rotation of the two sections of the mandrel through the gears 28 and 27. At the same time that the mandrel is started into operation the supply of water or other liquid which is used to moisten the adhesive with which the strips of material have previously been coated is turned on and this water flowing through the jets 131, thoroughly moistens the material before it is wound upon the mandrel. Since the material which is wound upon the mandrel during the initial operation of the apparatus forms the ends or chimes of the barrel it is necessary that it be slit in two parts when the winding operation starts. Ordinarily the knife 56 will of itself be sufficient to properly slit the material, but the knife 67, working in the same slit and against the surface of the strip as it is wound upon the mandrel, will insure that the strip is thoroughly cut. Since the mandrel sections are in engagement the springs 81 will draw the inner ends of the levers 72 toward the center of the machine so that the cam 82 is in position to permit the knives 56 and 67 to come into engagement with the material. The free end of the strip of material may be drawn under the knife 56 to slit the same before attaching it to the mandrel.

After the preliminary winding operation to form the chimes of the barrel has continued for a sufficient length of time to give these portions the necessary thickness clutch members 44 and 45 should be thrown into engagement to superimpose upon the rotary motion of the sections of the mandrel a longitudinal movement of each of them to form the intermediate portions of the barrel. Clutch members 44 and 45 may be thrown into engagement by drawing the handle 80 forwardly to rotate the bell-crank levers 79 and swing the clutch members 45 into engagement with the members 44 which are driven by the pulleys 43 and 49 and belt 48 from shaft 29. Since in this condition of the apparatus the inner ends of the levers 72 are held toward the center of the machine by the springs 81 the pins 75 will be at the outer ends of the slots in levers 76, so that these levers may be swung to cause engagement of the clutch members without engaging the pins 75 to disturb the positions of the rods 74 and the cam 82 which is attached to one of these rods. Rotation of the screws 39 will, through the nuts 38 on the ends of the brackets 37, cause a gradual separation of the two sections of the mandrel. At the same time the mandrel is being rotated so that the result of these two movements of the mandrel will be to wind each half of the strip of material in the form of a spiral with successive convolutions displaced slightly with respect to the preceding convolutions. The amount by which each convolution overlaps the other will depend upon the relative rotary and longitudinal movements of each mandrel and this relation may be changed as desired for different articles by shifting the belts 48 upon the different faces of the pulleys 43 and 49. While in the simple embodiment of the invention illustrated herein only two changes are provided for it will be understood that any number of changes may be obtained by additional pulleys, and also that a set of gears having a changeable ratio may be used in place of the simple pulleys and belts illustrated. If it be desired to produce an article relatively extended and without any considerable overlap of the convolutions the longitudinal speed of the mandrels must be increased with respect to their speed of rotation. On the other hand if it be desired to form the inclined portion of the article with a relatively large number of closely spaced convolutions the longitudinal speed of the mandrels should be relatively small as compared with their rotary speed. By providing driving connections whereby the ratio may be varied during the process of manufacturing an article, it is possible to vary the relative displacement of the convolutions from one end of the article to the other during the process of formation. In many cases this will be desirable as it will permit an article to be formed relatively thin at one portion and thick at another portion.

As shown in dotted lines in Fig. 1 the pins 87 are at the beginning of the operation retracted below the outer surface of the mandrel and they occupy this position as long as the preliminary winding of the material is taking place. As soon, however, as the mandrels begin to move longitudinally the ends of the pins will come into engagement with the inclined edges 92 of the actuators 90 which are within the mandrel. A further travel of the mandrels will cause these pins to ride up over the edges 92 and onto the cylindrical faces 91 of the actuators. When this occurs the points of the pins will be forced outwardly into engagement with the inside of the rolls of paper forming the chimes of the barrel. When the mandrels have reached such a position that this action occurs the ends of the bearings 88 within the mandrels will be in engagement with the ends of the actuators 90 so that the latter will thereafter partake of the motion of the mandrels and be gradually carried along with the latter, at the same time retaining all of the pins in engagement with the ends of the barrel, which will thus be securely retained upon the ends of the mandrels during the separation of the latter while the material is being spirally wound into its desired shape.

The spiral winding operation of the material will continue until the collars 70 on the mandrel sections come into engagement with the ends of the levers 72, thus tending to force the latter outwardly and through the pins 75 actuating the levers 76, disengaging clutch members 44 and 45, causing further longitudinal movement of the mandrels to cease. At the same time the cam 82 will be moved into the position shown in Fig. 1 causing the rod 60 to be moved forwardly to remove the knife 67 from in contact with the paper and through the bell crank lever 59 and rod 58 lifting the knife 56 out of its cutting position. At the time when the above operations occur the parts of the apparatus will occupy substantially the relative positions shown in Fig. 1 and the mandrels will occupy such a position that the ends of the article have come against the stop rings 123. Although longitudinal movement of the mandrels has ceased, they are still in rotation and the effect of this latter movement will be to wind a number of convolutions about the central or bilge portion of the barrel. The material will not be cut during this winding operation since the cutters 56 and 67 are out of contact with the strip. The winding operation of the bilge portion will continue until the size of the latter has increased so that roller 106 has been forced inwardly until member 105 passes out of its normal position beneath rod 108, whereupon the latter will drop and cause the knife 100 to cut off the strip of material. At the same time the depression of arms 101 under the action of the springs 102 will, through the bell-crank levers 110, cause the rods 112 to be drawn inwardly, and this motion of the rods will cause clutch members 46 and 47 to be drawn into engagement to again start the screws 39 into operation. There will be an appreciable interval of time between the release of knife 100 and the final engagement of clutch members 46 and 47, and during this time the continued rotation of the mandrel sections will be sufficient to wind the free end of the strip of material onto the article, the wiper 125 which engages it, assisting in this operation.

When the mandrel sections have reached the outer limits of longitudinal travel, as shown in Fig. 1, the collars 117 on the rods 94 will have passed under the pins on the ends of levers 115 as shown most clearly in this same figure. There is thus a connection between the levers 115 and the rods 94, so that when the rods 112 are actuated by the springs 102 an outward swing of the ends of levers 115 will take place drawing the actuators 90 within the mandrels, and permitting the pins to be withdrawn from engagement with the chimes of the barrel. On account of the fact that clutch members 46 and 47 have been thrown into engagement the mandrels will now be given a further outward longitudinal movement, but since the ends of the article are in engagement with the stop rings 123 the result will be that the ends of the mandrels will be withdrawn from the interior of the finished barrel and the latter will be released and fall into the chute 132, by which it is conveyed away. The apparatus should then be restored to its initial condition for the formation of another article. To move the mandrels toward each other the reversing gear 34 is operated to cause a reverse rotation of the shaft 29 and this reverse rotation will, through the screws 39, cause the mandrel sections to travel toward each other. Before the mandrel sections are, however, started into movement approaching each other, the lever arms 115 should be released from engagement with the collars 117, but should be retained in extreme position so that the clutch members 46 and 47 are in engagement to permit the screws 39 to be driven from the shaft 29 to restore the mandrel sections to their normal position. As the mandrel sections approach each other the stops 70 recede from the ends of levers 72, leaving the latter free to be drawn into their normal position by the springs 81. After the mandrels have reached their normal position in engagement with each other or during their travel to this normal position the pin actuators 90 may be restored to their normal position by pushing them inwardly by means of the rods 94 until the stops 96 on these rods engage the supports 97, at which time the actuators will occupy the correct position with relation to the engaging mandrels.

The operation of forming articles such as pails or tubs upon the apparatus is substantially the same as that described with reference to the barrel except that the knives 56 and 67 are retained in contact with the strip of material throughout the entire operation, so that instead of winding the strip in uncut condition to form the bilge, as in the case of the barrel, the strip is slit to form the top edges of the two articles, which in this case are formed simultaneously on the apparatus. It is also possible to form one article such as a pail or tub, upon the apparatus by starting the strip of material upon only one of the mandrels, moving the latter to form the spirally wound portion of the article, and then stopping longitudinal movement of the mandrel while giving it a further rotation to form the edge of the article. It will ordinarily be more convenient and will expedite the manufacture of articles such as pails, tubs and the like, if two of them be formed simultaneously, since the apparatus is capable of such use.

The various steps in the operation of forming an article are shown most clearly in Figs. 7 to 10 inclusive. The first of these figures shows the mandrels in engaging position with a few convolutions of material wound thereon and the knife 67 cutting the strips of material as they are being wound. Fig. 8 shows the position of the mandrel sections at the time when longitudinal movement of the latter has ceased and the article is in the form of the spirally wound convolutions just preparatory to applying the extra convolutions which form the bilge portion and which are shown in Fig. 9 where the knife 67 is out of contact with the material and a number of convolutions of the uncut material have been wound to form the bilge. The finished article is shown in Fig. 10 and the dotted lines indicate the inner contour of the article. If the article is a barrel, as it is in this figure, it would be necessary to apply heads thereto and for this purpose disks of wood or other suitable material having slightly tapered edges are driven into the chimes of the barrel and by their wedging action are securely held therein, but of course a suitable adhesive may be used to secure their retention within the chimes. The finished article may be painted or covered with any suitable preservative and in many cases if it is to be used as a container for liquids, it will be treated upon the inside with a suitable substance to render the material impervious to the contained liquid.

Figure 11:
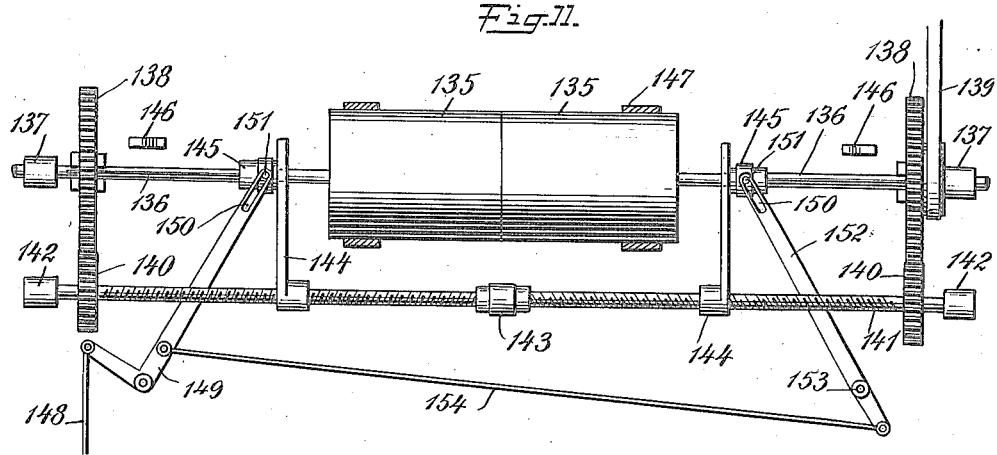
Fig. 11 is a simple form of the apparatus adapted to produce articles in which the requirements for strength are not as great as in the case of articles produced by the apparatus of the former figures.
Figure 12:
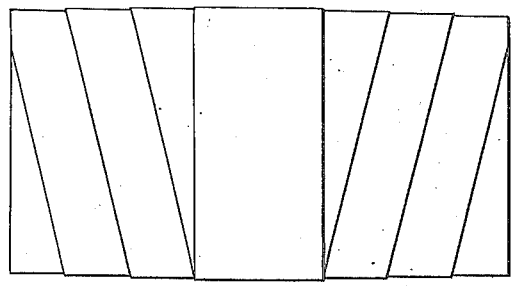
Fig. 12 is a view of an article produced upon the machine of Fig. 11.

Fig. 11 shows a modification of the apparatus of somewhat simpler construction and especially adapted to produce articles of the type shown in Fig. 12, which are comparatively thin and may be used as containers where great strength is not required.

The apparatus of Fig. 11 comprises two similar mandrels 135 mounted upon the ends of shafts 136 which are supported in suitable bearings 137. The shafts are adapted to be rotated by gear wheels 138 which are splined upon the shafts so that the latter may be moved with respect to the gear wheels to permit longitudinal movement of the mandrels. The gear wheels are driven from a belt 139 connected to any source of power. The right-hand gear-wheel 138 engages a second gear-wheel 140 on a shaft 141 mounted in bearings 142 and at the other end of this shaft is a corresponding gear-wheel 140 which engages with the left-hand gear-wheel 138 to cause rotation of the corresponding mandrel. The shaft 141 has over a portion of its length screw-threads of opposite pitch and preferably the shaft is made up of two sections connected together by a coupling 143. Upon each of the threaded portions of the section of the shaft are travelers 144 which, at their free ends, rest against stops 145 attached to the shafts 136 of the mandrels. As the shaft 141 is rotated during the winding operation the travelers 144 will be carried away from each other gradually causing the separation of the two mandrels. Since the mandrels are also at this time in rotation the result will be a spiral winding of the material which will continue until the travelers 144 reach such a point that their free ends engage cam surfaces 146 mounted on any convenient supports near the mandrel shaft. The free ends of the travelers will ride upon the inclined cam faces, thus causing the travelers to be lifted out of engagement with the stops 145 to prevent further longitudinal movement of the mandrels. The latter then may be given sufficient additional rotary movement to form the central or bilge portion of the article. At the time when the mandrels reach their limit of longitudinal movement the ends of the article come in contact with stops 147, which are in the form of fixed rings surrounding the mandrel, and which retain the article while the mandrel sections are being withdrawn therefrom to release the article. The last-named operation is effected by means of a rod 148 which is connected to a bell-crank lever 149 having at its outer end a slot 150 fitting over a pin 151 projecting from the stop 145 at the left-hand side of the machine. A similar lever 152 is provided at the other side of the machine and has a slot engaging a corresponding pin on the collar 145. This second lever is pivoted at 153 and connected by means of a rod 154 with the lever 149 so that when the latter is actuated there will be a simultaneous movement of the lever 152 with the result that the two mandrel sections are given a further separation to withdraw them from the interior of the finished article and allow the latter to be released. In connection with the apparatus described above any convenient arrangement of knives for slitting the material into strips, and jets for moistening it may be used.

In some cases it may be desirable to use strips of material not previously coated with an adhesive substance, and in such cases hot or cold liquid adhesive may be applied through one or both of the jets 131, and the wipers 125 may or may not be used as desired, and when expedient the jets 131 may be utilized to spray dry powdered adhesives during the winding operation. In the latter case a powdered substance would be used which would have the power of homogeneously uniting the convolutions under the influence of heat which may be applied in dry kilns after the articles are removed from the mandrels. Substances such as powdered asphaltum may be used in this manner to make articles which would be waterproofed thereby between each convolution of the material of which the article is formed.

It will be understood that various changes in the details of the apparatus described above, as well as still further modifications of the invention, may be made without departing from the principle thereof.

I claim:

1. In apparatus for making hollow articles, means for slitting a strip of material, and means for winding the strips of slitted material into the form of separate spirals with the convolutions of each spiral oppositely displaced with relation to those of the other.

2. In apparatus for making hollow articles, means for slitting a strip of material, and means for winding the strips of slitted material into the form of spirals with the convolutions thereof oppositely displaced out of the normal plane of the spirals.

3. In apparatus for making hollow articles, means for winding spirals of material in single planes, and means for moving said winding means axially to displace successive convolutions of the spirals with respect to each other.

4. Apparatus for making hollow articles, comprising means for winding spirals of material in single planes, and means for thereafter moving said winding means to produce axial displacement of successive convolutions of the spirals.

5. In apparatus for making hollow articles, a pair of co-axial mandrels having adjacent ends normally in engagement, means for rotating the mandrels to wind material thereon, and means for drawing the mandrels apart during the winding operation.

6. In apparatus for making hollow articles, a plurality of co-axial mandrels, means for rotating the mandrels to wind material thereon, means for slitting the material during the winding operation, and means for moving the mandrels longitudinally in opposite directions during the winding operation.

7. Apparatus for making hollow articles, comprising, in combination, a plurality of mandrels, means for rotating the mandrels to wind material thereon, and means for displacing the mandrels with respect to each other in opposite directions during the winding operation to cause the material to be wound in the form of oppositely directed spirals with axially displaced convolutions.

8. Apparatus for making hollow articles, comprising a plurality of mandrels, means for rotating the mandrels simultaneously to wind strips of material thereon, means for simultaneously displacing the mandrels with respect to each other in opposite directions during the winding operation to cause the material to assume the form of separate oppositely directed spirals having axially displaced convolutions.

9. Apparatus for making hollow articles, comprising a plurality of mandrels, means for rotating the mandrels to wind material thereon, means for slitting material during the winding operation, means for imparting to the mandrels a longitudinal movement in opposite directions whereby the material is wound in the form of successive axially displaced convolutions, and means under the control of the mandrels for stopping the longitudinal movement thereof while permitting the rotary movement to continue.

10. Apparatus for making hollow articles, comprising a plurality of mandrels, means for rotating the mandrels to wind material thereon, means for slitting the material during the winding operation, means for imparting to the mandrels a longitudinal movement in opposite directions whereby the material is wound in the form of successive axially displaced convolutions, and means under the control of the mandrels for stopping the longitudinal movement thereof while permitting the rotary movement to continue and for rendering the slitting means ineffective.

11. Apparatus for making hollow articles, comprising a pair of mandrels, means for rotating the mandrels to wind material thereon, means for moving the mandrels longitudinally in opposite directions during the winding operation, and means for retaining the material upon the ends of the mandrels during the longitudinal movement thereof.

12. Apparatus for making hollow articles, comprising a pair of mandrels, means for rotating the mandrels to wind material thereon, means for moving the mandrels longitudinally in opposite directions during the winding operation, means for retaining the material upon the end of the mandrels during the longitudinal movement thereof, and means for controlling the operation of the retaining means.

13. Apparatus for making hollow articles, comprising a mandrel, means for rotating the mandrel to wind material thereon, means for moving the mandrel longitudinally during the winding operation, and means for altering the relation between the speed of rotation and the longitudinal speed of the mandrel.

14. Apparatus for making hollow articles, comprising a plurality of mandrels, means for rotating the mandrels to wind material thereon, means for moving the mandrels longitudinally in opposite directions during the winding operation, and means for altering the relative rotary and longitudinal speed of each mandrel.

15. Apparatus for making hollow articles, comprising means for slitting a band of material into a plurality of strips, means for winding the strips thus produced in the form of adjacent flat spirals, means for separating these spirals while continuing the winding operation to cause the strips to assume the form of elongated spirals, and means for rendering the separating means and the slitting means ineffective while permitting the winding means to continue to wind material about the central portion of the article.

16. Apparatus for making hollow articles, comprising means for winding a strip of material into convolutions with matched edges, means for displacing said winding means to cause the convolutions to have spaced edges, and means for automatically stopping the operation of the second-named means to cause the material to be wound again in the form of convolutions having matched edges.

17. Apparatus for making hollow articles, comprising means for winding a strip of material to form an inner end ring, means for thereafter causing the winding means to wind the strip of material into a body portion having successively displaced convolutions, and means for stopping the action of the second-named means to cause the material to be wound in the form of a second end ring.

18. Apparatus for making hollow articles, comprising means for holding material previously coated with adhesive, means for moistening the material, means for slitting the material, means for winding the strips of slitted material and means for causing longitudinal displacement of said winding means in opposite direction to cause the strips of material to assume the form of oppositely directed spirals having axially displaced convolutions united to each other by the adhesive.

19. Apparatus for making hollow articles, comprising a cylindrical member, means for rotating the member to wind material thereon, means mounted on the cylindrical member for retaining the end of the material in place, and means mounted within the cylindrical member for retaining the convolutions of material in place upon the end of the member.

20. Apparatus for making hollow articles, comprising a cylindrical member, means for rotating the member to wind material thereon, means mounted on the cylindrical member for retaining the end of the material in place, means mounted within the cylindrical member for retaining the convolutions of material in place upon the end of the member, and means within the cylindrical member for controlling the operation of the retaining means.

21. Apparatus for making hollow articles, comprising a cylindrical member, means for rotating the member to wind material thereon, means for retaining the convolutions of material in place upon the cylindrical member, and means within the cylindrical member for controlling the operation of the retaining means.

22. Apparatus for making hollow articles, comprising a cylindrical member, means for rotating the member to wind material thereon, means for retaining the convolutions of material in place upon the cylindrical member, means within the cylindrical member for actuating the retaining means, and means rendered effective when the windings of material reach a predetermined diameter for withdrawing the actuating means to release the retaining means.

23. Apparatus for making hollow articles, comprising means for winding material, means for retaining material upon the winding means during the winding operation means for controlling said retaining means, means for cutting off the material, means dependent upon the diameter of the wound material for actuating said cutting means and said controlling means to release the retaining means and permit the removal of the article.

24. Apparatus for making hollow articles, comprising means for slitting a band of material into a plurality of strips, means for winding the strips thus produced in the form of adjacent flat spirals, means for separating the spirals while continuing the winding operation to cause the strips to assume the form of elongated spirals, means for rendering the separating means and the slitting means ineffective while permitting the winding means to continue to wind material about the central portion of the article, and means actuated when the central portion of the article reaches a predetermined diameter to cause the winding means to be withdrawn from within the article.

25. Apparatus for making hollow articles, comprising knives for slitting a band of material into a plurality of strips, mandrels for winding the strips thus produced in the form of adjacent flat spirals, means for separating the mandrels while continuing the winding operation to cause the strips to assume the form of elongated spirals, means controlled by the mandrels for rendering the separating means and the knives ineffective while permitting the mandrels to continue to wind material about the central portion of the article, and means actuated when the central portion of the article reaches a predetermined diameter to cause the mandrels to be withdrawn from within the article.

In testimony whereof I affix my signature.

GEORGE C. SNYDER.